(12) United States Patent
Langhorst et al.

(10) Patent No.: US 11,142,645 B2
(45) Date of Patent: Oct. 12, 2021

(54) STRATEGIC NANOPARTICLE REINFORCEMENT OF NATURAL FIBERS FOR POLYMERIC COMPOSITES

(71) Applicant: Ford Global Technologies, LLC, Dearborn, MI (US)

(72) Inventors: Amy Ellen Langhorst, Ann Arbor, MI (US); Deborah Frances Mielewski, Ann Arbor, MI (US); Alper Kiziltas, Sarikamis (TR)

(73) Assignee: Ford Global Technologies, LLC, Dearborn, MI (US)

( * ) Notice: Subject to any disclaimer, the term of this patent is extended or adjusted under 35 U.S.C. 154(b) by 161 days.

(21) Appl. No.: 16/298,392

(22) Filed: Mar. 11, 2019

(65) Prior Publication Data

US 2019/0276670 A1    Sep. 12, 2019

Related U.S. Application Data

(60) Provisional application No. 62/641,731, filed on Mar. 12, 2018.

(51) Int. Cl.
| | | |
|---|---|---|
| C08L 97/02 | (2006.01) | |
| C08J 3/22 | (2006.01) | |
| C08J 5/04 | (2006.01) | |
| A01C 1/06 | (2006.01) | |
| A01G 29/00 | (2006.01) | |

(52) U.S. Cl.
CPC ............... *C08L 97/02* (2013.01); *A01C 1/06* (2013.01); *A01G 29/00* (2013.01); *C08J 3/226* (2013.01); *C08J 5/045* (2013.01); *C08J 2397/02* (2013.01); *C08L 2205/16* (2013.01)

(58) Field of Classification Search
CPC ....... C08L 97/02; C08L 2205/16; C08J 3/226; C08J 5/045; C08J 5/06; C08J 2397/02; A01C 1/06; A01G 29/00; C08K 9/12
See application file for complete search history.

(56) References Cited

U.S. PATENT DOCUMENTS

| 9,574,136 B2 | 2/2017 | Lian |
|---|---|---|
| 2005/0009170 A1 | 1/2005 | Gardea-Torresdey et al. |
| 2005/0079977 A1 | 4/2005 | Choi et al. |
| 2007/0059505 A1* | 3/2007 | Williams ................ B29C 70/12 428/292.1 |
| 2010/0255110 A1 | 10/2010 | Toon et al. |
| 2015/0033418 A1 | 1/2015 | Lommel et al. |
| 2016/0044882 A1 | 2/2016 | Herr |
| 2017/0280712 A1 | 10/2017 | Lillard, Jr. et al. |
| 2019/0111654 A1* | 4/2019 | Izawa ..................... B32B 27/12 |

FOREIGN PATENT DOCUMENTS

WO    WO2015051780 A1 *    4/2015    ............. A01G 31/02

OTHER PUBLICATIONS

Mohammed et al.; Micro and Nanosystems, 2017, vol. 9, No. 1, p. 1-12.*
Khalil et al.; Industrial Crops and Products, 2010, vol. 31, p. 113-121.*
He, Junhui et al., Facile In Situ Synthesis of Noble Metal Nanoparticles in Porous Cellulose Fibers, Chemistry of Materials, vol. 15(23), pp. 4401-4406, ACS Publications, Oct. 22, 2003.
Gogos, A. et al., Vertical Transport and Plant Uptake of Nanoparticles in a Soil Mesocosm Experiment, Journal of Nanobiotechnology, vol. 14:40, 2016.
Hischemöller, A., et al., In-Vivo Imaging of the Uptake of Upconversion nanoparticles by Plat Roots, Journal of Biomedical Nanotechnology, vol. 5, pp. 1-7, Jun. 2009.
Ma, et al., Interactions Between Engineered Nanoparticles (ENPs) and Plants: phytotoxicity, uptake and accumulation, Science of the Total Environment, vol. 408(16), Abstract, Jul. 15, 2010.
Lee, et al., Toxicity and Bioavailability of Copper Nanoparticles to the Terrestrial Plants Mung Bean (Phaseolus radiatus) and Wheat (Triticum aestivum): plant agar test for water-insoluble nanoparticles, Environ Toxicol Chem., vol. 27(9), Abstract, Sep. 2008.
Zhu, et al., Uptake, Translocation, and Accumulation of Manufactured Iron Oxide Nanoparticles by Pumpkin Plants, J. Environ. Monit., vol. 10(6), Abstract, Jun. 2008.
Lin, et al., Uptake, Translocation, and Transmission of Carbon Nanomaterials in Rice Plants, Small, Wiley Online Library, vol. 5(10), Abstract, 2009.

* cited by examiner

Primary Examiner — Robert S Jones, Jr.
(74) Attorney, Agent, or Firm — Burris Law, PLLC

(57) ABSTRACT

A composite material is provided that includes a polymer matrix and fiber reinforcements within the polymer matrix, the fiber reinforcements including natural fibers having nanoparticles accumulated within a structure of the natural fibers. A method of forming the composite material is also provided that includes accumulating nanoparticles into the structure of the natural fibers to create accumulated natural fibers, drying the accumulated natural fibers, and mixing the accumulated natural fibers within the polymer matrix.

14 Claims, 9 Drawing Sheets

STRATEGIC NANOPARTICLE REINFORCEMENT OF NATURAL FIBERS FOR POLYMERIC COMPOSITES

CROSS-REFERENCE TO RELATED APPLICATIONS

This application claims the benefit of and priority to U.S. Provisional Application No. 62/641,731 filed on Mar. 12, 2018. The disclosure of the above application is incorporated herein by reference.

FIELD

The present disclosure relates to composite materials, and more particularly to composite materials reinforced with natural fibers and nanoparticles.

BACKGROUND

The statements in this section merely provide background information related to the present disclosure and may not constitute prior art.

Natural fibers have been investigated for use as reinforcements in polymer matrix composites due to their low density, lower cost, and lower abrasiveness relative to other synthetic fiber reinforcements such as glass or carbon. However, their strength, modulus, and degradation temperatures are lower than synthetic fibers, and natural fibers also have a tendency to absorb moisture. Lower mechanical properties as well as poor interfacial bonding between the fiber and matrix due to opposing polarities generally results in a non-structural composite.

Nanoparticle reinforced polymers have also been of interest in recent years, due to the ability of a very small quantity of filler/reinforcement to result in significant property improvements. However, nanoparticles tend to aggregate during processing, resulting in poor dispersion within the composite matrix. Additionally, nanoparticles are generally classified as hazardous substances, requiring special handling during processing.

These challenges with natural fiber and nanoparticle reinforced composites are addressed by the present disclosure.

SUMMARY

In one form of the present disclosure, a composite material is provided that comprises a polymer matrix and fiber reinforcements within the polymer matrix. Advantageously, the fiber reinforcements comprise natural fibers having nanoparticles accumulated within a structure of the natural fibers, thereby increasing the strength of the composite material with a natural fiber that is more sustainable and reduces toxicity concerns with nano-reinforced polymer matrix composites.

The fiber reinforcements may be continuous or discontinuous, and the nanoparticles may be a variety of types including, but not limited to, carbon-based nanoparticles, metals and/or metal oxide nanoparticles, polymer nanoparticles, inorganic nanoparticles, functionalized nanoparticles, carbon coated metal nanoparticles, and combinations thereof. The polymer matrix may be any thermoset or thermoplastic resin system that is compatible with the accumulated natural fibers and subsequent forming operations as set forth in greater detail below. In one form, a two-part thermoset resin is also accumulated into the structure of the natural fibers, in addition to the nanoparticles to improve fiber properties such as flexural modulus, flexural strength, tensile modulus, tensile strength, elongation at break, storage modulus, loss modulus, impact strength, fire resistance, moisture absorption, and thermal properties such as glass transition temperature, degradation temperatures, and heat deflection temperatures, among others.

In one form, the natural fibers are from a plant. The plant may include, by way of example, zucchini, corn, tomato, soybean, bitter melon, rapeseed, radish, ryegrass, lettuce, cucumber, cabbage, red spinach, *faba* bean, *arabidopsis*, carrot, onion, barley, rice, switchgrass, tobacco, wheat, garden cress, sorghum, mustard, alfalfa, *onobrychis*, pumpkin, garden pea, leek, peppers, flax, ryegrass, barley, agave, cattail, mung bean, cotton, algae, *lemna gibba*, cilantro, squash, bean, grasses, landoltia *punctata*, elsholtzia *splendens*, microcystis *aeruginosa, elodea densa*, bamboo, cane, carnation, dicot, lily, sugar cane, monocot, and *Brassica rapa*.

Generally, the structure of the natural fiber comprises an outer primary cell wall, interior secondary walls consisting of an amorphous region, and a central lumen. The nanoparticles are accumulated and dispersed throughout the structure of the natural fiber, and in one form, the nanoparticles are aligned and are dispersed within the lumen to provide increased strength, e.g., tensile strength, of the accumulated natural fiber. In another form, the nanoparticles are dispersed in an outer primary cell wall to increase the overall modulus of the accumulated natural fiber.

The present disclosure also includes parts formed from the innovative composite material, as well as vehicles (e.g., motor vehicles) having such parts. The parts may be formed by any of a number of composite material fabrication techniques such as, by way of example, hand layup, fiber placement, resin transfer molding (RTM), compression molding, injection molding, and blow molding, among others.

In another form, a method of forming a composite material is provided that comprises accumulating nanoparticles into a structure of natural fibers to create accumulated natural fibers, drying the accumulated natural fibers, and mixing the accumulated natural fibers within a polymer matrix. In one form, the nanoparticles are dispersed in solution for accumulation into the structure of the natural fibers. As previously set forth, the natural fibers may be from a plant, and the solution is selected from the group consisting of water, alcohol, agar, soil, wetted media, murashige and skoog, sewage sludge, sand, hoagland, an aqueous medium, mineral nutrient solutions in a water solvent, mineral nutrient solutions and glass beads in a water solvent, mineral nutrient solutions and a perlite substrate in a water solvent, and combinations thereof. Further, when the natural fibers are from a plant, the nanoparticle solution may be applied to the plant through at least one of a root tip, a plant wound, leaf stomata, seeds, an external spray, an injection, incubation vials, and a culture. Additionally, the accumulation is accelerated through at least one of hot-to-cold water shock, thermal cycling, white fluorescent lighting, and hydroponics.

The step of drying the accumulated natural fibers may be carried out over a predetermined time and at a predetermined temperature profile to control distribution of the accumulated nanoparticles. The method may also include an additional step of post-processing the dried accumulated natural fibers prior to mixing with the polymer matrix. This post-processing may include, by way of example, chopping, winding, chemical treatment (e.g., alkali treatment), heat treatment, washing, radiation treatment (e.g., UV, plasma, corona), and steam explosion, among others.

DRAWINGS

In order that the disclosure may be well understood, there will now be described various forms thereof, given by way of example, reference being made to the accompanying drawings, in which.

Figure 1:
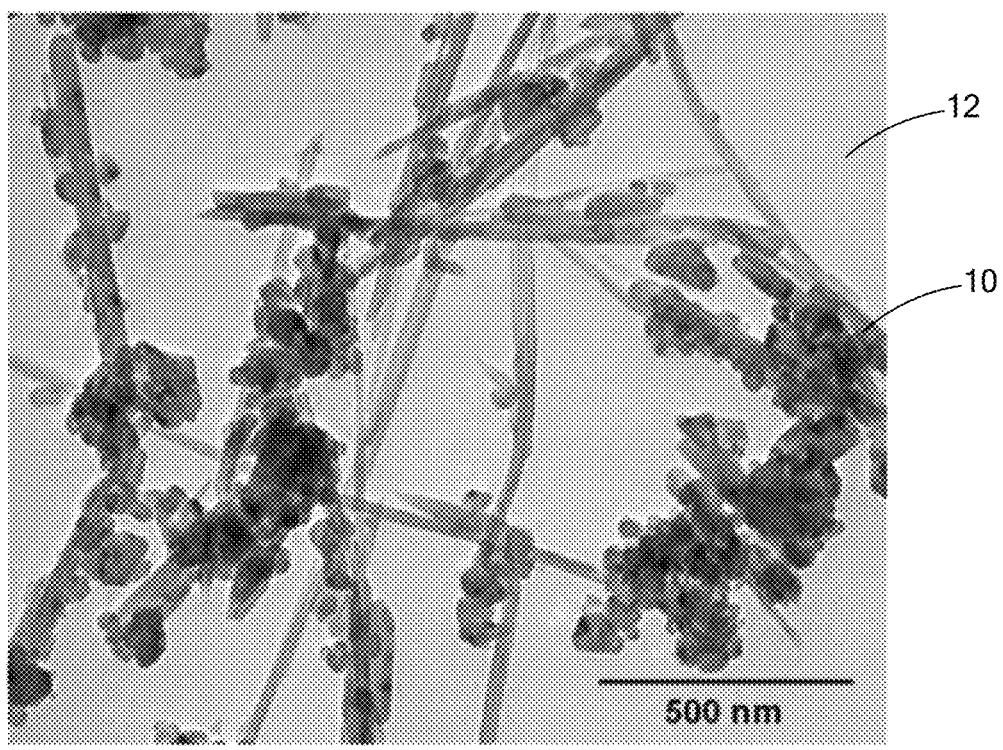
FIG. 1 is a photomicrograph of a nanoparticle reinforced composite material, according to the prior art.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

The present disclosure provides an innovative composite material that is formed from natural fibers that have accumulated nanoparticles, in which the natural fibers have improved mechanical properties due to the presence of the nanoparticles. The accumulated natural fibers are combined with a polymer matrix to form the composite material, which may be processed in any number of ways to create lightweight, strong, and sustainable parts, particularly for use in motor vehicles.

Referring to FIG. 1, nanoparticles 10 are generally particles between 1 and 100 nanometers (nm) in size with a surrounding interfacial layer 12, in which the interfacial layer includes ions, inorganic and organic molecules. Nanoparticles are advantageous as a reinforcement in composite materials due the ability of a very small quantity of nanoparticles providing significant improvements in mechanical properties.

Figure 2:
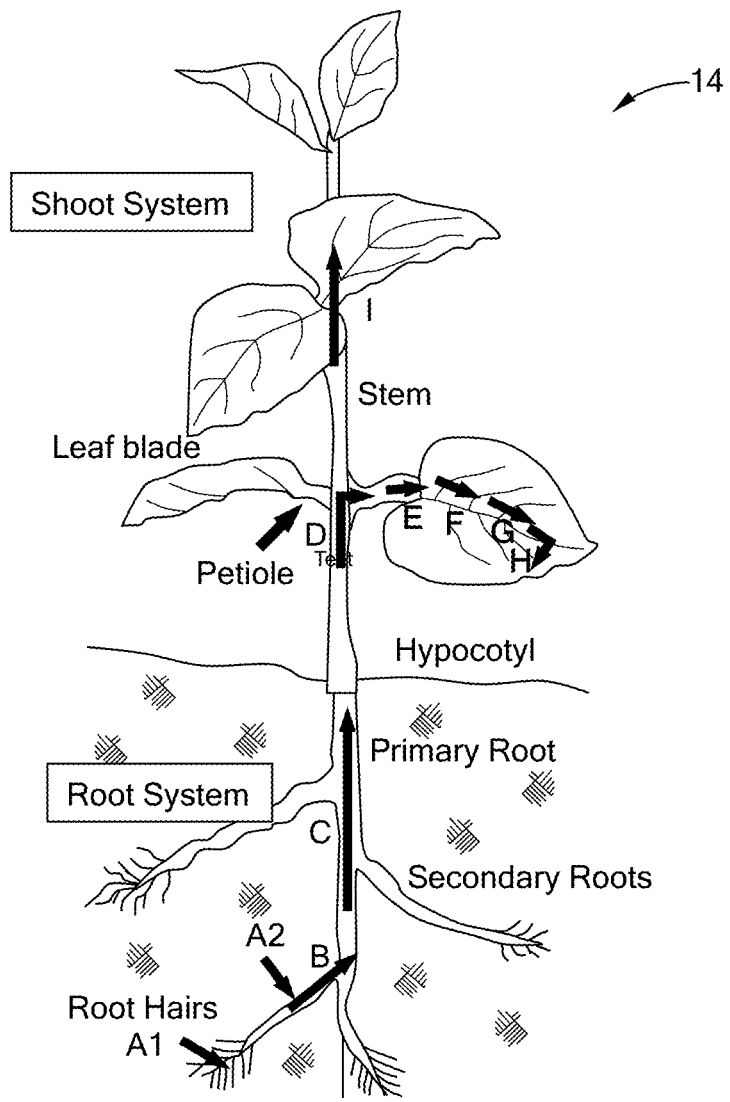
FIG. 2 is a schematic diagram of a plant and the general principle of uptake, according to the prior art.

Referring now to FIG. 2, a schematic view of a plant 14 is shown and the general principle of uptake, transport, and accumulation of nanoparticle matter by the plant 14. As shown, nanoparticles 10 from FIG. 1 are absorbed by primary roots A2 or lateral roots (A1 and then B). The nanoparticles 10 are then transported from root C through the stem (D and I) to leaf (E, F, G, H). Further, the nanoparticles 10 can also be adsorbed on the surface of the roots. The principles of uptake, transport, and accumulation are described in greater detail in the following references which are incorporated herein by reference in their entirety: (1) U.S. Patent Application Publication No. 2005/0009170; (2) U.S. Patent Application Publication No. 2005/0079977; (3) *Uptake, translocation and accumulation of manufactured iron oxide nanoparticles by pumpkin plants*, Zhu et al., J. Environ. Monit. (2008) 10, pp. 713-717; (4) *Uptake, translocation and transmission of carbon nanomaterials in rice plants*, Lin et al., Small (2009), pp. 1128-1132; (5) *Toxicity and bioavailability of copper nanoparticles to the terrestrial plants mung beans (Phaseolus radiatus) and wheat (Triticum awstivum): plant uptake for water insoluble nanoparticles*, Lee et al., Environ. Toxicol. Chem. (2008) 29(9), pp. 1915-19231; (6) *Interactions between engineered nanoparticles (ENPs) and plants: phytotoxicity, uptake and accumulation*, Ma et al., Science of the Total Environment (2010), 408.16, pp. 3053-3061; (7) *In-vivo imaging of the uptake of conversion nanoparticles by plant roots*, Hischemoller et al., J. Biomed. Nanotechnol. (2009) 5, pp. 278-284.

Figure 3:
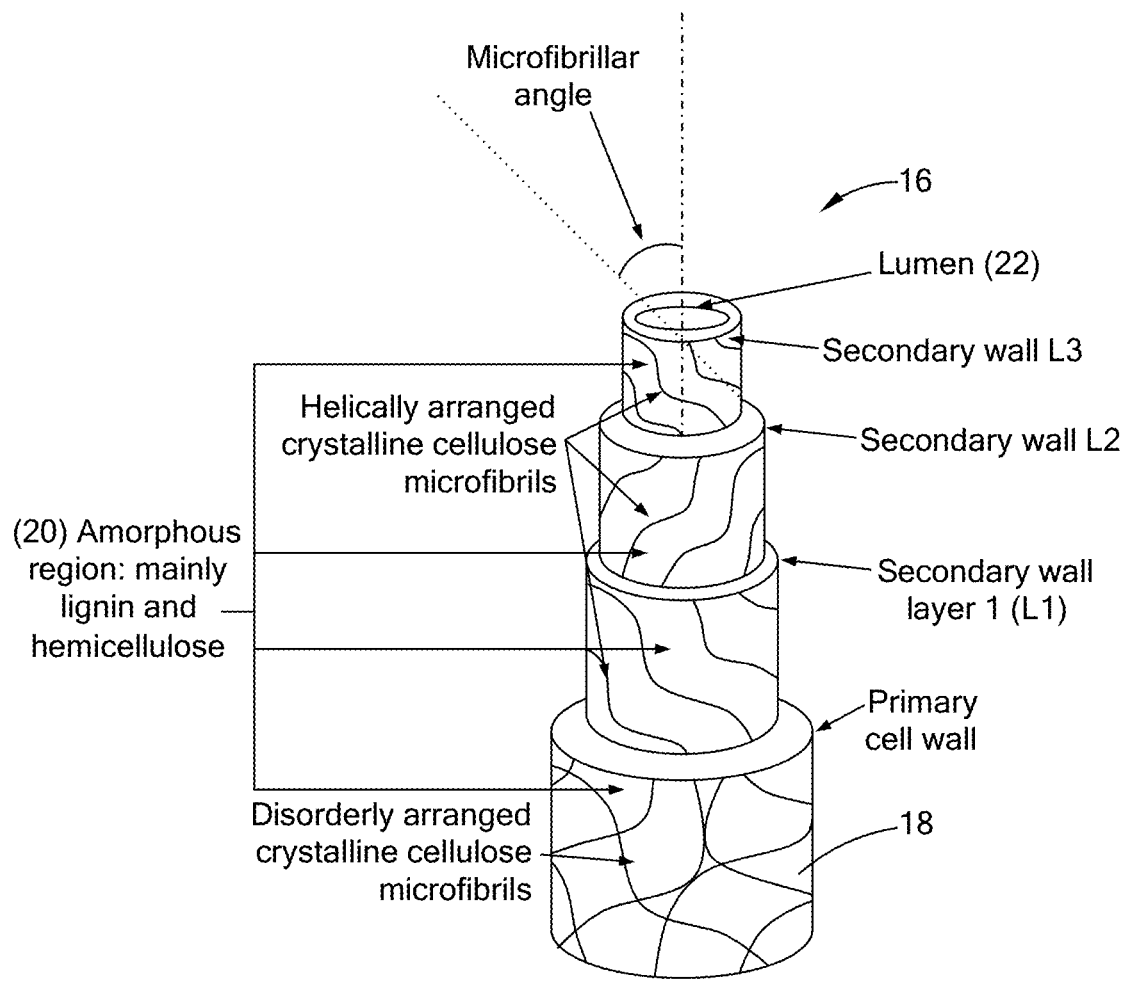
FIG. 3 is a perspective view of a natural fiber structure, according to the prior art.

Referring to FIG. 3, the structure of a natural fiber 16, which in one form may be a plant, is shown in greater detail. The structure includes an outer primary cell wall 18, interior secondary walls consisting of an amorphous region 20, and a central lumen 22. As set forth in greater detail below, the nanoparticles 10 are strategically accumulated into this structure for tailored mechanical properties of a composite material.

Figure 4:
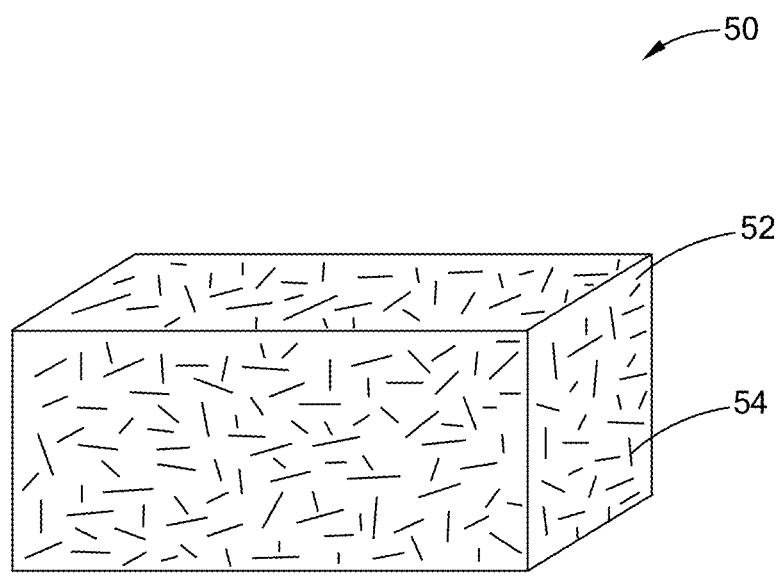
FIG. 4 is an enlarged schematic view of an exemplary composite material having a polymer matrix and fiber reinforcements within the polymer matrix, the fiber reinforcements comprising natural fibers having nanoparticles accumulated within a structure of the natural fibers, according to the teachings of the present disclosure.

Referring now to FIG. 4, an innovative composite material is shown and generally indicated by reference numeral 50. The composite material 50 comprises a polymer matrix 52 and fiber reinforcements 54 within the polymer matrix 52. Generally, the fiber reinforcements 54 comprise natural fibers having nanoparticles accumulated within their structure (FIG. 3).

The nanoparticles 10 are dispersed in solution for accumulation into the structure of the natural fibers 16. In one form, the natural fibers 16 are from a plant 14 and the solution is selected from the group consisting of water, alcohol, agar, soil, wetted media, murashige and skoog, sewage sludge, sand, hoagland, an aqueous medium, mineral nutrient solutions in a water solvent, mineral nutrient solutions and glass beads in a water solvent, mineral nutrient solutions and a perlite substrate in a water solvent, and combinations thereof. In one form, a concentration of nanoparticles 10 within the structure of the natural fibers 16 is greater than about 5 mg/L. In one variation, a two-part thermoset resin is also accumulated into the structure of the natural fibers 16. This accumulation is generally accomplished over a period of time that is dependent on the type of plant, the type of solution, the type of nanoparticles, and the type of thermoset resin.

Further, the nanoparticle solution may be applied to the plant 14 through at least one of a root tip, a plant wound, leaf stomata, seeds, an external spray, an injection, incubation vials, and a culture. The accumulation may also be accelerated through at least one of hot-to-cold water shock, thermal cycling, white fluorescent lighting, and hydroponics.

The nanoparticles 10 may be any of a variety of materials, including by way of example, carbon-based nanoparticles, metals and/or metal oxide nanoparticles, polymer nanoparticles, inorganic nanoparticles, functionalized nanoparticles, carbon coated metal nanoparticles, and combinations thereof.

The plant 14 may also be any of a variety of plants, including by way of example, zucchini, corn, tomato, soybean, bitter melon, rapeseed, radish, ryegrass, lettuce, cucumber, cabbage, red spinach, faba bean, arabidopsis, carrot, onion, barley, rice, switchgrass, tobacco, wheat, garden cress, sorghum, mustard, alfalfa, onobrychis, pumpkin, garden pea, leek, peppers, flax, ryegrass, barley, agave, cattail, mung bean, cotton, algae, lemna gibba, cilantro, squash, bean, grasses, landoltia punctata, elsholtzia splendens, microcystis aeruginosa, elodea densa, bamboo, cane, carnation, dicot, lily, sugar cane, monocot, and Brassica rapa.

After the nanoparticles 10, (and the two-part thermoset resin if employed), are accumulated into the structure of the natural fibers 16, the accumulated natural fibers are dried and then mixed with the polymer matrix 52. The accumulated natural fibers may be discontinuous or continuous, depending on the application, which in one form are parts for motor vehicles such as leaf guards, console substrates, door panels, under hood components such as oil pans and engine cover, and trim components, among others.

The step of drying the accumulated natural fibers is carried out over a predetermined time and at a predetermined temperature profile to control distribution of the accumulated nanoparticles. Further, a step of post-processing the dried accumulated natural fibers may be employed prior to mixing the accumulated natural fibers with the polymer matrix. For example, such post-processing may include chopping, winding, chemical treatment (e.g., alkali treatment), heat treatment, washing, radiation treatment (e.g., UV, plasma, corona), and steam explosion, among others.

Figure 5:
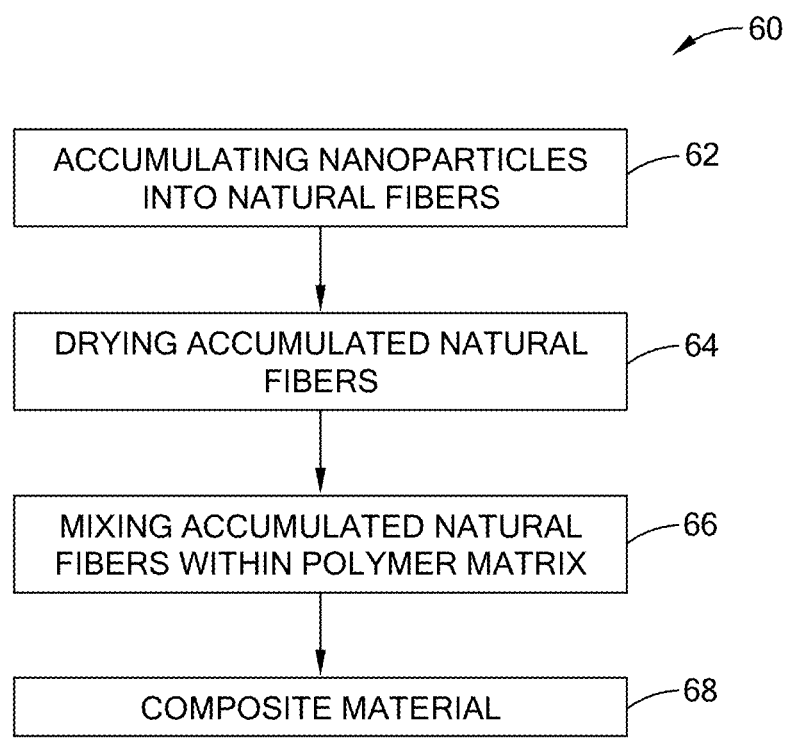
FIG. 5 is a flow diagram of an exemplary method of forming a composite, material according to the teachings of the present disclosure.

Referring now to FIG. 5, a general method 60 of forming a composite material is shown that comprises accumulating nanoparticles into a structure of natural fibers to create accumulated natural fibers at step 62. The natural fibers with the accumulated nanoparticles are dried at step 64 and mixed within a polymer matrix at step 66 to provide a composite material at step 68.

EXAMPLES

Figures 6, 7:
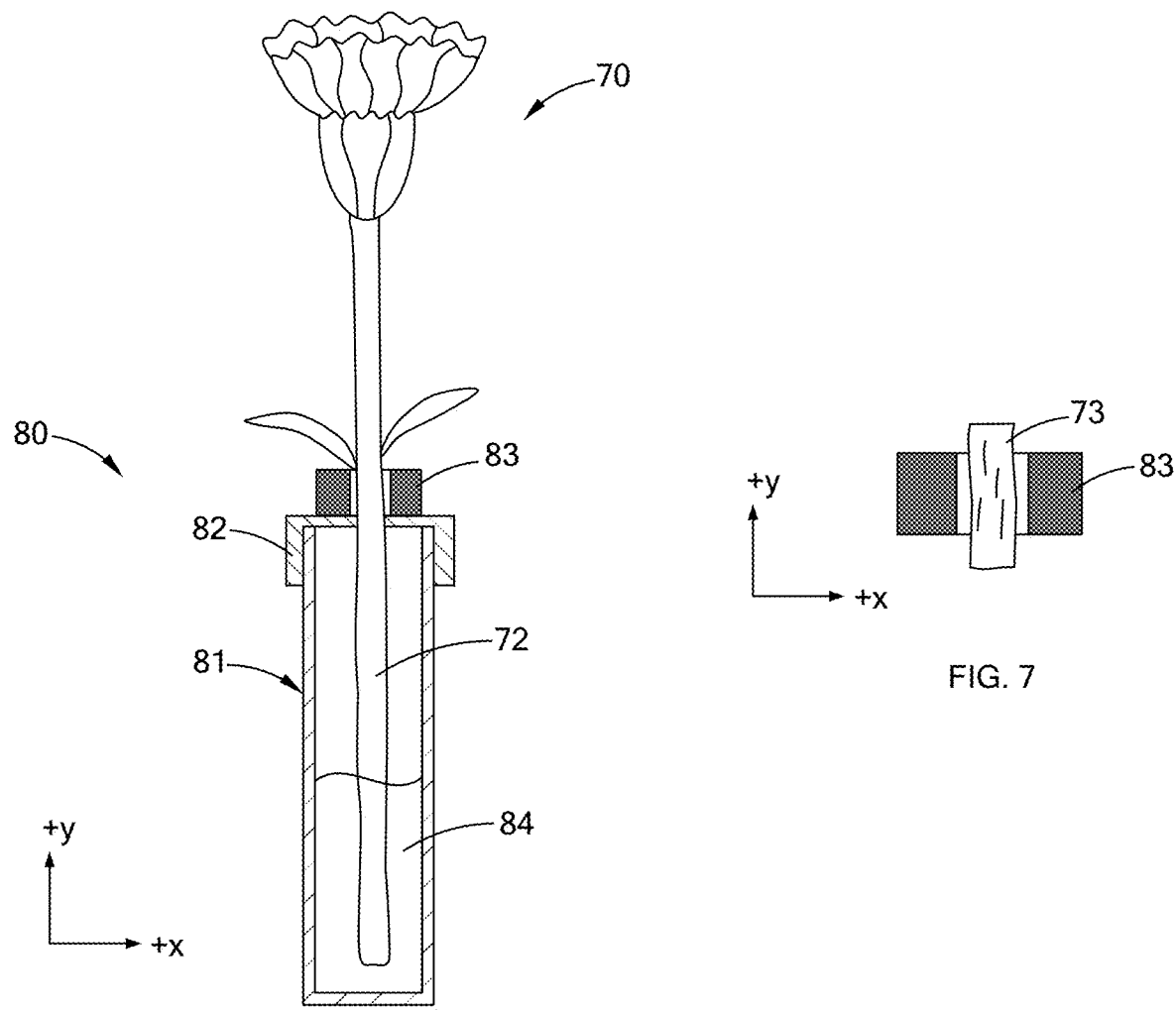
FIG. 6 is a cross-sectional side view of an exemplary plant in an aqueous solution of nanoparticles according to the teachings of the present disclosure.
FIG. 7 is a cross-sectional side view of a section of the sample in FIG. 6 according to the teachings of the present disclosure.

Referring now to FIG. 6, a plant 70 and an uptake apparatus 80 for accumulating nanoparticles within the plant 70 are schematically depicted. The plant 70 comprises a stem 71 and the uptake apparatus 80 comprises a container 81 (e.g. vial), a cap 82, a magnet 83, and a ferrofluid magnetite nanoparticle solution 84 (herein referred to simply as a "nanoparticle solution"). It should be understood that nanoparticle solution 84 may or may not include plant nutrients to promote growth of the plant 70. The stem 71 is positioned within the cap 82 and the magnet 83 such that a magnetic field (not shown) from the magnet 83 extends into the stem 71. The nanoparticle solution is placed (poured) into the container 81, a lower portion (−y direction) of the stem 71 is placed in the nanoparticle solution 84, the cap 82 is attached to the container 81, and the plant 70 (i.e., stem 71) is maintained in the nanoparticle solution for nine (9) days. The cap 82 reduces nanoparticle solution contamination and waste and the magnet 83 (i.e., the magnetic field) is used to assist in drawing nanoparticles into the stem 71 and positioning the nanoparticles proximate to the position of the magnet 83.

Referring to FIG. 7, the magnet 83 and a stem section 73 cut from the stem 72 in FIG. 6 are shown. The stem section 73 is cut below (−y direction) and above (+y direction) the position of the magnet 83 in FIG. 6. The stem section 73 and the magnet 83 are placed within a vibrating sample magnetometer (VSM) to determine the magnetic properties of the stem section 73.

Figure 8:
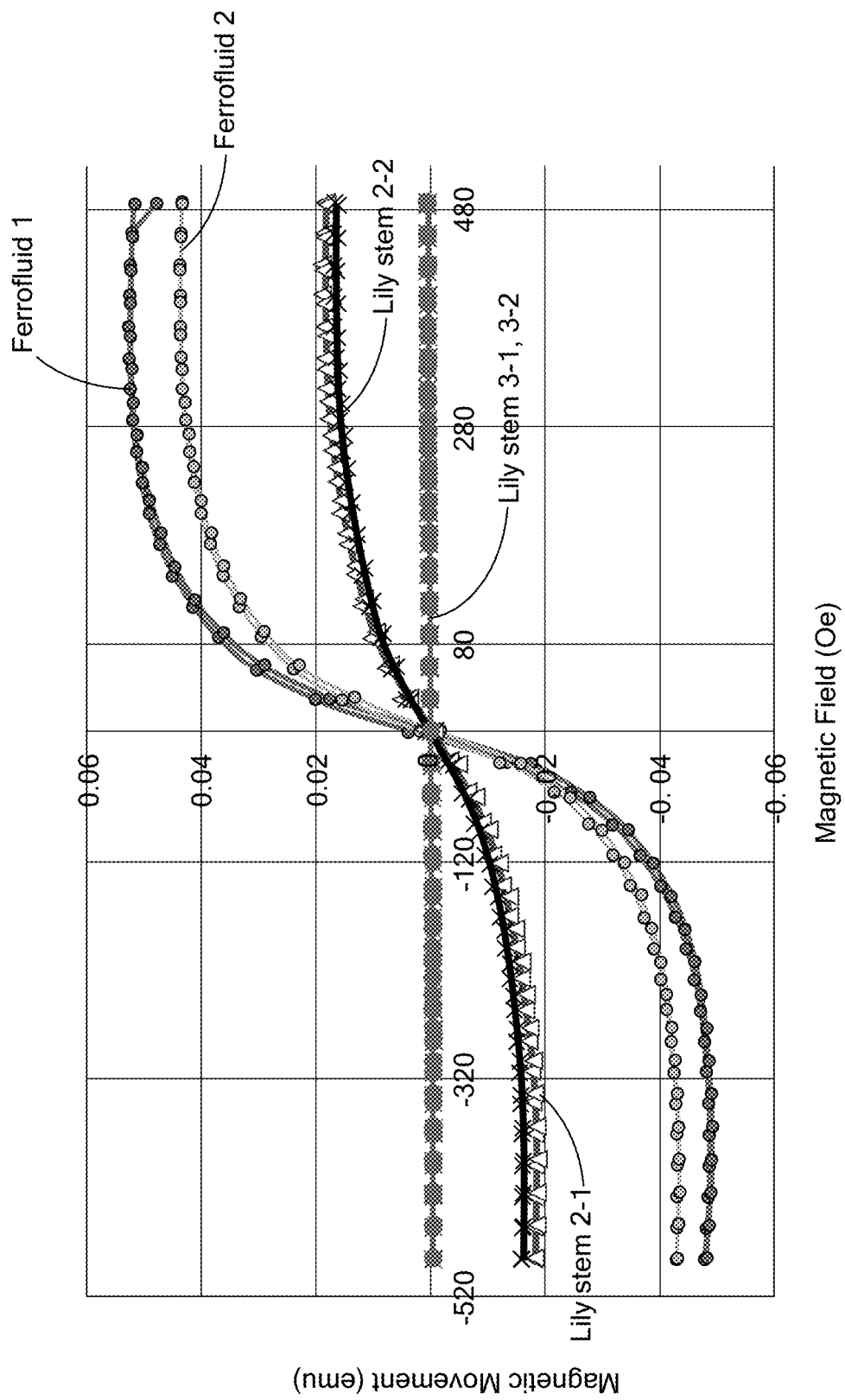
FIG. 8 is an exemplary hysteresis graph of the magnetic moment (emu) as a function of the magnetic field (Oe) for various materials according to the teachings of the present disclosure.

Referring now to FIG. 8, the results of testing four Lily stem sections (Lily stem sections 2-1, 2-2, 3-1, 3-2) held in uptake apparatuses 80 for 9 days using two different nanoparticle solutions (Ferrofluid 1 and Ferrofluid 2) are graphically depicted. Particularly, hysteresis curves of magnetic moment versus magnetic field for the two nanoparticle solutions and four Lily stem sections are shown in FIG. 8. The ferrofluids exhibited the largest change in magnetic moment as a function of changing magnetic field, followed by the Lily stems 2-1 and 2-2, and then the Lily stems 3-1 and 3-2. While the change in magnetic moment as a function of changing magnetic field appears minimal (flat) in FIG. 8, FIG. 9 graphically illustrates that the Lily stems 3-1 and 3-2 did exhibit an increase in magnetic moment with an increase in magnetic field.

Figure 10:
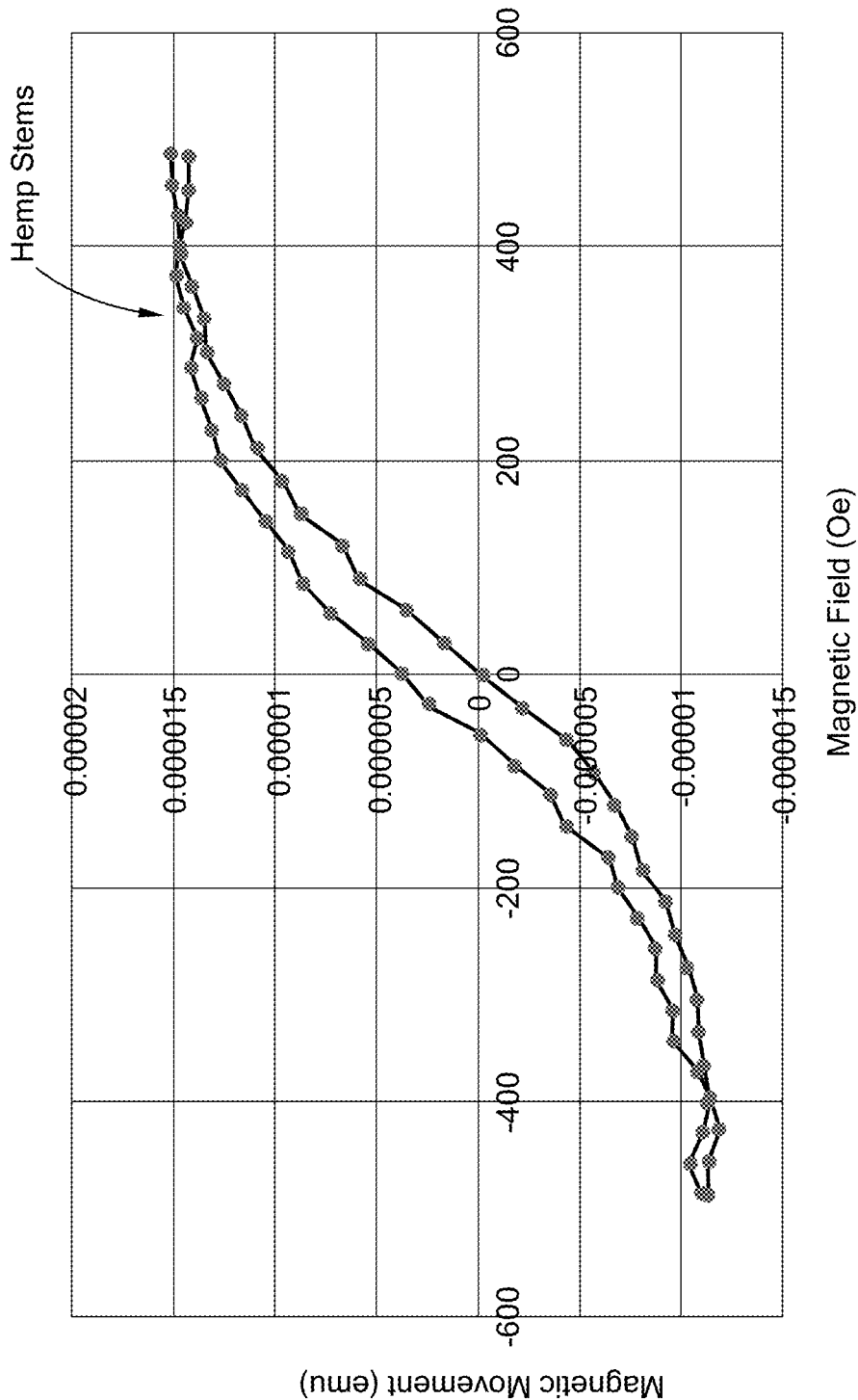
FIG. 10 is an exemplary hysteresis graph of hemp stems impregnated with nanoparticles according to the teachings of the present disclosure.

Referring now to FIG. 10, a hysteresis curve for hemp stem section subjected to the same treatment as the Lily stems is graphically shown.

Regarding an increase in the Young's modulus of fibers obtained from the Lily stem sections 2-1 and 2-2 (referred to here after as "L2 Lily stems" or simply "L2"), the following analysis and calculations were performed.

Figure 9:
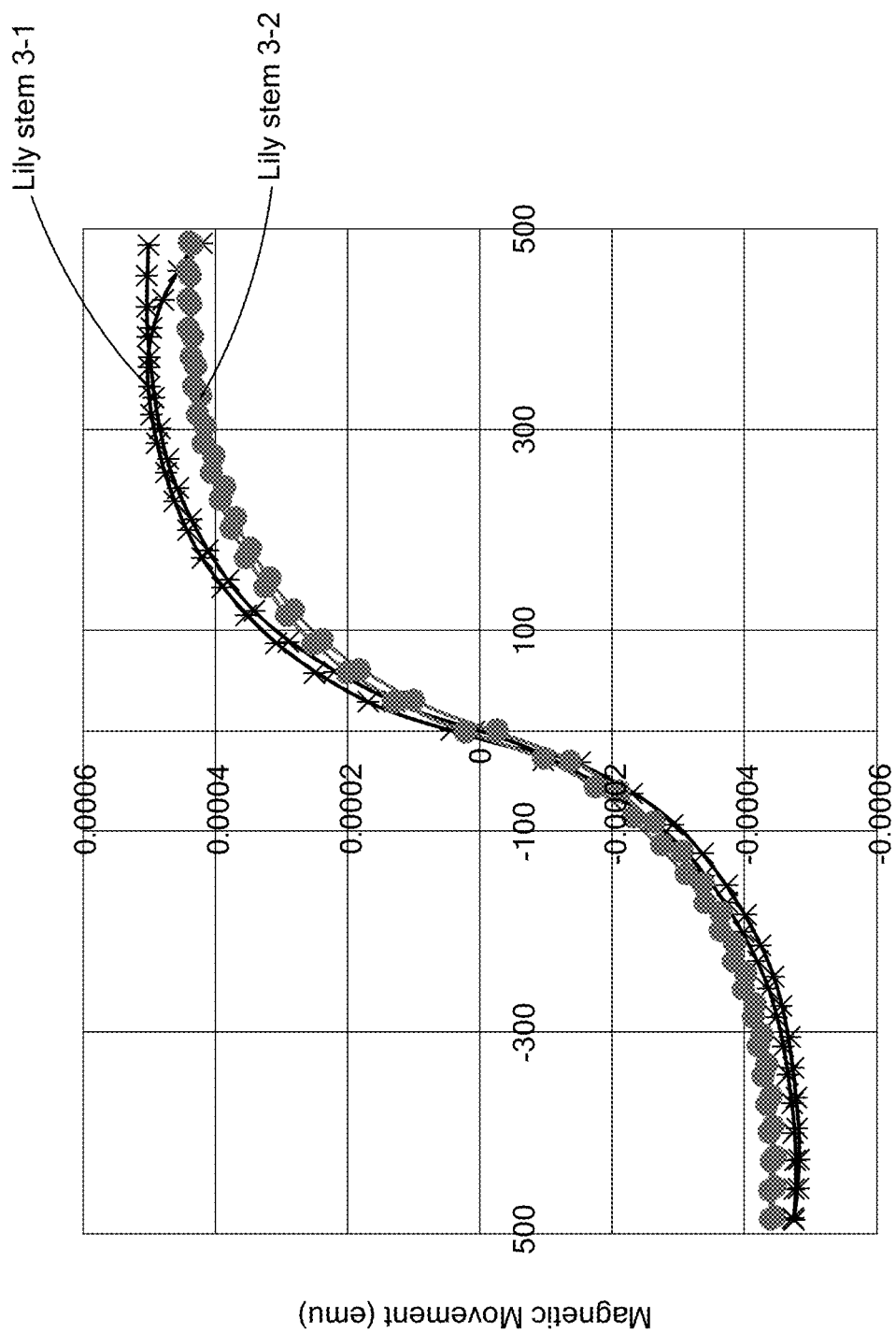
FIG. 9 is a magnified view of the hysteresis graph FIG. 8 showing ferromagnetic behavior of Lily stems 3-1, 3-2 according to the teachings of the present disclosure.

The average weight of the L2 Lily stem sections was 0.14 grams (g) and the saturation magnetization was 0.018 emu (FIG. 9). The average water content (fraction) of the L2 Lily stem sections was assumed to be 0.57, the density of the magnetite particles in the nanoparticle solutions was 5.15 g/cm$^3$, and the magnetite saturation per unit volume was 400 emu/cm$^3$.

The dry weight of the L2 Lily stems was calculated from the expression:

$$\text{Fresh Weight}-(\text{fresh Weight}*\text{Fraction of } H2) \tag{1}$$

which equaled: 0.14 g−(0.14 g×0.57)=0.06 g. Also, the magnetite content in the L2 Lily stems was calculated from the expression:

$$\text{Saturation Magnetization}*(\text{Volume/Saturation})*\text{density} \tag{2}$$

which equaled (0.018 emu/400 emu/cm$^3$)*5.15 g/cm$^3$=2.37×10$^{-4}$ g. The corresponding percentage of magnetite in the L2 Lily stems was calculated from the expression:

$$(\text{Magnetite content in } L2)/(L2 \text{ dry weight}) \tag{3}$$

which equaled 2.37×10$^{-4}$ g/0.6 g=0.4 wt. %. Previous studies have shown 1 wt. % of magnetite nanoparticles accumulated into a plant stem results in a 36% increase in Young' modulus of plant stem fibers. Accordingly, 0.4 wt % of magnetite nanoparticles accumulated into the L2 Lily stem sections linearly extrapolates to an increase of about 15% in Youngs modulus. A summary of the analysis and estimation of Young's modulus increase in the L2 Lily stem sections is shown in Table 1 below.

TABLE 1

| | | |
|---|---|---|
| Lily 2 (L2) Sample Weight—Fresh | 0.14 | g |
| L2 Saturation Magnetization | 0.018 | emu |
| Average water content of plant matter | 0.57 | fraction |
| Density of Magnetite | 5.15 | g/cm$^3$ |
| Magnetite saturation/volume | 400 | emu/cm$^3$ |
| Number of Nanoparticles | 10$^{12}$ | |
| L2 Dry Weight | = Fresh weight − (Fresh Weight * Fraction of H20) <br> = 14g − (0.14g * 0.57) <br> = 0.06 g | |
| Magnetite content in L2 | $= \text{Saturation Magnetization} * \frac{\text{Volume}}{\text{Saturation}} * \text{density}$ <br><br> $= \frac{0.018 \, \text{emu}}{400 \frac{\text{emu}}{\text{cm}^3}} * 5.15 \frac{\text{g}}{\text{cm}^3}$ <br><br> $= 2.37 \times 10^{-4}$ g | |
| Percentage Magnetite in L2 | $= \frac{\text{Magnetite content in } L2}{L2 \text{ Weight} - \text{Dry}}$ <br><br> $= \frac{237E - 04 \, \text{g}}{0.6 \, \text{g}}$ <br><br> = 0.4 wt % ~15% elastic modulus improvement | |

Unless otherwise expressly indicated herein, all numerical values indicating mechanical/thermal properties, compositional percentages, dimensions and/or tolerances, or other characteristics are to be understood as modified by the word "about" or "approximately" in describing the scope of the present disclosure. This modification is desired for various reasons including industrial practice, manufacturing technology, and testing capability.

The description of the disclosure is merely exemplary in nature and, thus, variations that do not depart from the substance of the disclosure are intended to be within the scope of the disclosure. Such variations are not to be regarded as a departure from the spirit and scope of the disclosure.

As used herein, the phrase at least one of A, B, and C should be construed to mean a logical (A OR B OR C), using a non-exclusive logical OR, and should not be construed to mean "at least one of A, at least one of B, and at least one of C.

What is claimed is:

1. A composite material formed by a method comprising:
   growing plants in an aqueous solution comprising nanoparticles such that at least a portion of the nanoparticles are accumulated into a structure of natural fibers within the plants to create accumulated natural fibers;
   removing the plants from the aqueous solution;
   drying the plants such that the accumulated natural fibers are dried; and
   mixing the accumulated natural fibers within a polymer matrix,
   wherein the accumulated natural fibers form fiber reinforcements within the polymer matrix.

2. The composite material according to claim 1, wherein the fiber reinforcements are discontinuous.

3. The composite material according to claim 1, wherein the nanoparticles are selected from the group consisting of carbon-based nanoparticles, metals and/or metal oxide nanoparticles, polymer nanoparticles, inorganic nanoparticles, functionalized nanoparticles, carbon coated metal nanoparticles, and combinations thereof.

4. The composite material according to claim 1, wherein the plants are selected from the group consisting of zucchini, corn, tomato, soybean, bitter melon, rapeseed, radish, lettuce, cucumber, cabbage, red spinach, *faba* bean, *arabidopsis*, carrot, onion, barley, rice, switchgrass, tobacco, wheat, garden cress, sorghum, mustard, alfalfa, *onobrychis*, pumpkin, garden pea, leek, peppers, flax, ryegrass, agave, cattail, mung bean, cotton, algae, *lemna gibba*, cilantro, squash, bean, grasses, landoltia *punctata*, elsholtzia *splendens*, microcystis *aeruginosa, elodea densa*, bamboo, cane, carnation, dicot, lily, sugar cane, monocot, and *brassica* rapa.

5. The composite material according to claim 1, wherein the structure of the natural fiber comprises an outer primary cell wall, interior secondary walls consisting of an amorphous region, and a central lumen, wherein the nanoparticles are dispersed throughout the entire structure of the natural fiber.

6. The composite material according to claim 1 further comprising a two-part thermoset resin accumulated into the structure of the natural fibers.

7. The composite material according to claim 1, wherein a concentration of nanoparticles within the structure of the natural fibers is greater than about 5 mg/L.

8. A part formed of the composite material according to claim 1.

9. A vehicle having at least one part according to claim 8.

10. The composite material according to claim 1, wherein the aqueous solution is applied to the plants through at least one of a root tip, a plant wound, leaf stomata, seeds, an external spray, an injection, incubation vials, and a culture.

11. The composite material according to claim 10, wherein accumulation is accelerated through at least one of hot-to-cold water shock, thermal cycling, white fluorescent lighting, and hydroponics.

12. The composite material according to claim 1, wherein the step of drying the accumulated natural fibers is carried out over a predetermined time and at a predetermined temperature profile to control distribution of the accumulated nanoparticles.

13. The composite material according to claim 1, further comprising a step of post-processing the dried accumulated natural fibers prior to mixing with the polymer matrix.

14. The composite material according to claim 13, wherein the post-processing comprises chopping, winding, chemical treatment, heat treatment, washing, radiation treatment, and steam explosion.

\* \* \* \* \*